United States Patent
Wu (10) Patent No.: US 8,229,464 B1
(45) Date of Patent: Jul. 24, 2012

(54) SYSTEM AND METHOD FOR IDENTIFYING CORRELATIONS BETWEEN GEOGRAPHIC LOCATIONS

(75) Inventor: Ping Wu, San Bruno, CA (US)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 12/649,967

(22) Filed: Dec. 30, 2009

(51) Int. Cl.
*H04W 24/00* (2009.01)

(52) U.S. Cl. .......... 455/456.1; 455/456.2; 455/456.3; 455/456.6; 455/456.5; 455/414.1

(58) Field of Classification Search ............. 455/456.1, 455/456.2, 456.3, 456.5, 456.6, 414.1, 414.2
See application file for complete search history.

(56) References Cited

U.S. PATENT DOCUMENTS

| | | | | |
|---|---|---|---|---|
| 6,650,902 B1 * | 11/2003 | Richton | ...... | 455/456.3 |
| 6,741,864 B2 * | 5/2004 | Wilcock et al. | ...... | 455/456.1 |
| 7,412,442 B1 | 8/2008 | Vadon et al. | | |
| 7,535,492 B2 * | 5/2009 | Kahn et al. | ...... | 348/211.1 |
| 7,571,121 B2 * | 8/2009 | Bezos et al. | ...... | 705/26.7 |
| 2008/0071761 A1 * | 3/2008 | Singh et al. | ...... | 707/5 |
| 2008/0254808 A1 * | 10/2008 | Rekimoto | ...... | 455/456.1 |
| 2009/0156234 A1 * | 6/2009 | Sako et al. | ...... | 455/456.3 |

OTHER PUBLICATIONS https://affiliate-program.amazon.com/gp/associates/join/links.html, printed on Dec. 16, 2009.

* cited by examiner

*Primary Examiner* — Ajit Patel
*Assistant Examiner* — Khai M Nguyen
(74) *Attorney, Agent, or Firm* — Lerner, David, Littenberg, Krumholz & Mentlik, LLP (57) ABSTRACT

A system and method identifies correlations between locations. A server may receive information identifying an action and a location from a plurality of users. The server may assign a weighted value to each action and store the weighted value and location in a database. The database may be used to generate vector data for each location identifying the weighted values for a number of users. In response to receiving a location from a particular user device, the server may identify a vector associated with the received location. The location vector may be compared to other location vectors to determine if there is any correlation between the vectors. Where the server identifies a correlated vector, the server may send the identification of the corresponding location or information associated with the corresponding location to the particular user device.

18 Claims, 5 Drawing Sheets

SYSTEM AND METHOD FOR IDENTIFYING CORRELATIONS BETWEEN GEOGRAPHIC LOCATIONS

BACKGROUND OF THE INVENTION

Mobile devices are used in various locations around the world to capture, send, and receive information. For example, mobile phone uses may take pictures, take video, or request information over a cellular or computer network. This information may be shared with other users or stored on a network.

BRIEF SUMMARY OF THE INVENTION

The present invention relates generally to identifying correlations between geographic locations. More specifically, network devices may collect information regarding user device actions taken at a variety of locations. The information from different user devices may be used to identify possible relationships or similarities between the different locations.

An aspect of the invention provides a method of identifying correlated locations based on information received from a plurality of client devices over a network. The method includes receiving, from each client device, information indicating a geographic location and at least one action taken at that geographic location; for each action associated with a particular client device, identifying a weighted value based on that action for the particular client device at the geographic location; for each client device, storing in a database an association between the weighted value and the geographic location; and identifying a correlation between a first geographic location and a second geographic location based on the stored associations.

In one example, identifying the correlation includes generating, from the stored associations, a plurality of vectors, each vector associated with a given geographic location and including at least some of the plurality of client devices and the weighted value associated with each of the at least some of the plurality of client devices at that given location; receiving information identifying the first geographic location from a first client device; identifying a vector of the plurality of vectors associated with the first geographic location; and comparing the identified vector and other vectors of the plurality of vectors to determine if a correlation exists. In one alternative, the method further comprising transmitting the second geographic location to the first client device. In another alternative, identifying content information associated with the second geographic location; and transmitting the identified content information to the first client device. The identified content information may an advertisement associated with the second geographic location. In a further alternative, the first geographic location is identified in a request for information. In still a further alternative, the first geographic location is identified in a visual search request. In another alternative, the first geographic location is identified in a map search request.

A further aspect of the invention provides a method of identifying correlated locations based on information received from a plurality of client devices each associated with a user over a network. The method includes receiving, from each client device, information identifying a particular user associated with the client device, information indicating a geographic location, and at least one action associated with the particular user taken at that geographic location; for each action associated with the particular user, identifying a weighted value based on that action for the particular user at the geographic location; for each particular user, storing in a database an association between the weighted value and the geographic location; and identifying a correlation between a first geographic location and a second geographic location based on the stored associations.

In one example, the information identifying a particular user is user login information.

Another aspect of the invention provides a device for identifying correlated locations based on information received from a plurality of client devices over a network. The device includes memory accessible by the device and a processor. The processor is configured to receive, from each client device of the plurality of client devices, information indicating a geographic location and at least one action taken at that geographic location; identify, for each action associated with a particular client device, a weighted value based on that action for the particular client device at the geographic location; for each client device, store in the memory an association between the weighted value and the geographic location; and identify a correlation between a first geographic location and a second geographic location based on the stored associations.

In one example, the processor is also configured to generate, from the stored associations, a plurality of vectors, each vector associated with a given geographic location and including at least some of the plurality of client devices and the weighted value associated with each of the at least some of the plurality of client devices at the given location; receive information identifying the first geographic location from a first client device; identify a vector of the plurality of vectors associated with the first geographic location; and compare the identified vector and other vectors of the plurality of vectors to determine if a correlation exists. In one alternative, the processor is also configured to transmit the second geographic location to the first client device. In another alternative, the processor is also configured to identify content information associated with the second geographic location; and transmit the identified content information to the first client device. The identified content information may be an advertisement associated with the second geographic location. In a further alternative, the first geographic location is identified in a request for information. In still a further alternative, the first geographic location is identified in a visual search request. In another alternative, the first geographic location is identified in a map search request.

In a further example, the at least one action received from each of the plurality of client devices is selected from the group consisting of capturing an image, capturing video, capturing audio, or a request for information.

In yet another example, the processor is also configured to identify the weighted value based on the sum of all of the actions for the particular client device at the geographic location.

DETAILED DESCRIPTION

Figure 1:
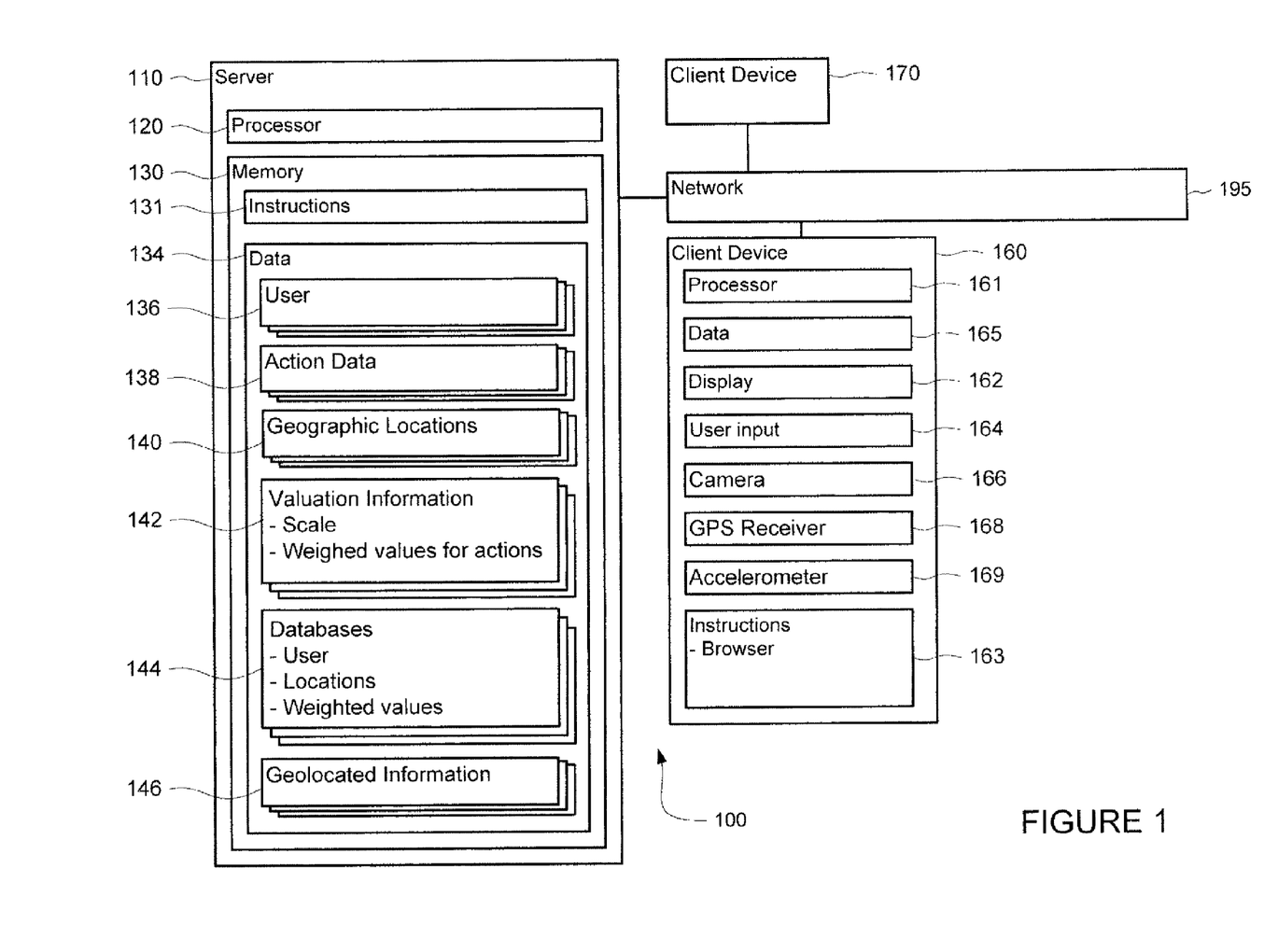
FIG. 1 is a functional diagram of a system in accordance with an aspect of the invention.
Figure 2:
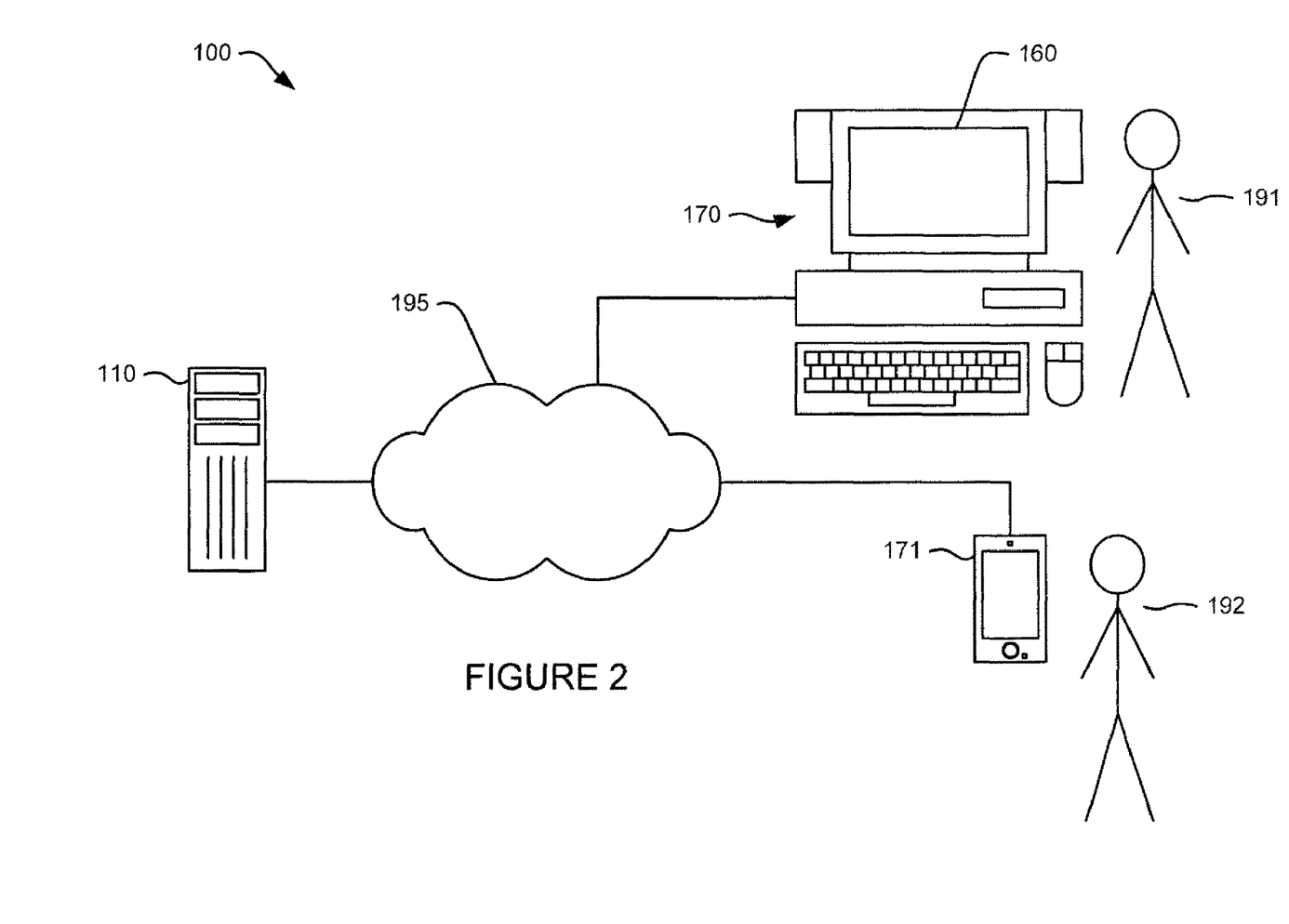
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 131 and data 134 that may be executed or otherwise used by the processor 120. The memory 130 may be of any type capable of storing information accessible by the processor, including a computer-readable medium, or other medium that stores data that may be read with the aid of an electronic device, such as a hard drive, memory card, ROM, RAM, DVD or other optical disks, as well as other write-capable and read-only memories. Systems and methods may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 195 and capable of directly and indirectly communicating with other nodes of the network. For example, computer 110 may comprise a web server that is capable of communicating with client devices 160 and 170 via network 150 such that server 110 uses network 195 to transmit and display information to a user on display 162 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 160 or 170 may be a personal computer intended for use by a person 191-92, and have all of the components normally used in connection with a personal computer such as a central processing unit (CPU) 161, memory (e.g., RAM and internal hard drives) storing data 165 and instructions 163, an electronic display 162 (e.g., a monitor having a screen, a small LCD touch-screen, a projector, a television, a computer printer or any other electrical device that is operable to display information), end user input 164 (e.g., a mouse, keyboard, touch-screen or microphone). The client device may also include a camera 166, GPS receiver 168, speakers, a network interface device, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 170 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

The client devices may also include a geographic position component to determine the geographic location and orientation of the device. For example, client device 160 may include a GPS receiver 168 to determine the device's latitude, longitude and/or altitude position. The position component may also comprise software for determining the position of the device based on other signals received at the client device 160, such as signals received at a cell phone's antenna from one or more cell phone towers if the client device is a cell phone. It may also include an accelerometer 169 or gyroscope to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Returning to FIG. 1, data 134 may include user information 136 which identifies users of the systems, i.e., any entity that interacts with the systems or methods such as people or businesses. User information may be used to determine which user is interacting with the system. It will be understood that user information may refer only to a user's device and not actually identify any actual person or entity. Thus, if two client devices are associated with a particular user, server 110 may identify actions associated with each client device, but may not identify the devices as associated with the same user. As will be described in more detail below, a particular user or user device may request information or take some action associated with a geographic location.

Action data 138 may identify information received or requested from a particular client device. For example, client devices may identify various activities involving capturing information at a particular location. Users may take pictures, use visual search applications such as Google Goggles, take video or audio recordings, access an augmented reality application, etc. As will be described in more detail below, the server may use action data to determine correlations (if any) between discrete physical locations or points of interest at those locations.

Action data 138 may be received by the server 110 in an active or a passive manner. For example, if a user initiates some action over the network and the server receives information regarding the action without requesting it, this information is received passively. In another example, the client device may request information from the server. In response, the server may actively request more information from the client device.

Server 110 may also access geographic location information 140. For example, upon receipt of information such as GPS information, server 110 may identify a geographic location. Locations may be expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. The system and method may further translate locations from one reference system to another. For example, the client 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

Server 110 may also access geolocated information 146. This information may include any information associated with at least one location. For example, geolocation information 146 may include advertisements, pictures, videos, user reviews, websites, etc.

Valuation information 142 may be used to determine a weighted value associated with one or more actions at a particular location. Each activity described above may be associated with a weighted value. For example, activities may be valued on a scale between 0 and 1, may be a binary 0 or 1, or a number along a scale (0.152).

Weighted values may be determined in various ways. For example, the final score for user i on location j may be defined as a weighted sum of scores on different user actions. More significant actions may be valued more than less significant actions. For example, taking one picture at a given location may have a relatively low ranking, e.g. on the order of 0.1, while taking 20 pictures at the same location may equate to a higher ranking, e.g. on the order of 0.6. In another example, video of a location may be valued greater than 20 pictures of the location, e.g. with a ranking on the order of 0.8.

It will be understood that any method of associating or ranking values may be used, and any scale besides 0 to 1 (e.g., 0 to 100) may be used.

Data 134 may be associated with one or more databases. The databases 144 may include matrixes or other representations which are used to identify associations between users, geographic locations, and weighted values. Each user, or user's device, may be associated with one or more geographic locations (which may be anywhere on Earth). As will be described in more detail below, the matrix may indicate a weighted value of actions identified at particular geographic locations.

Figure 3:
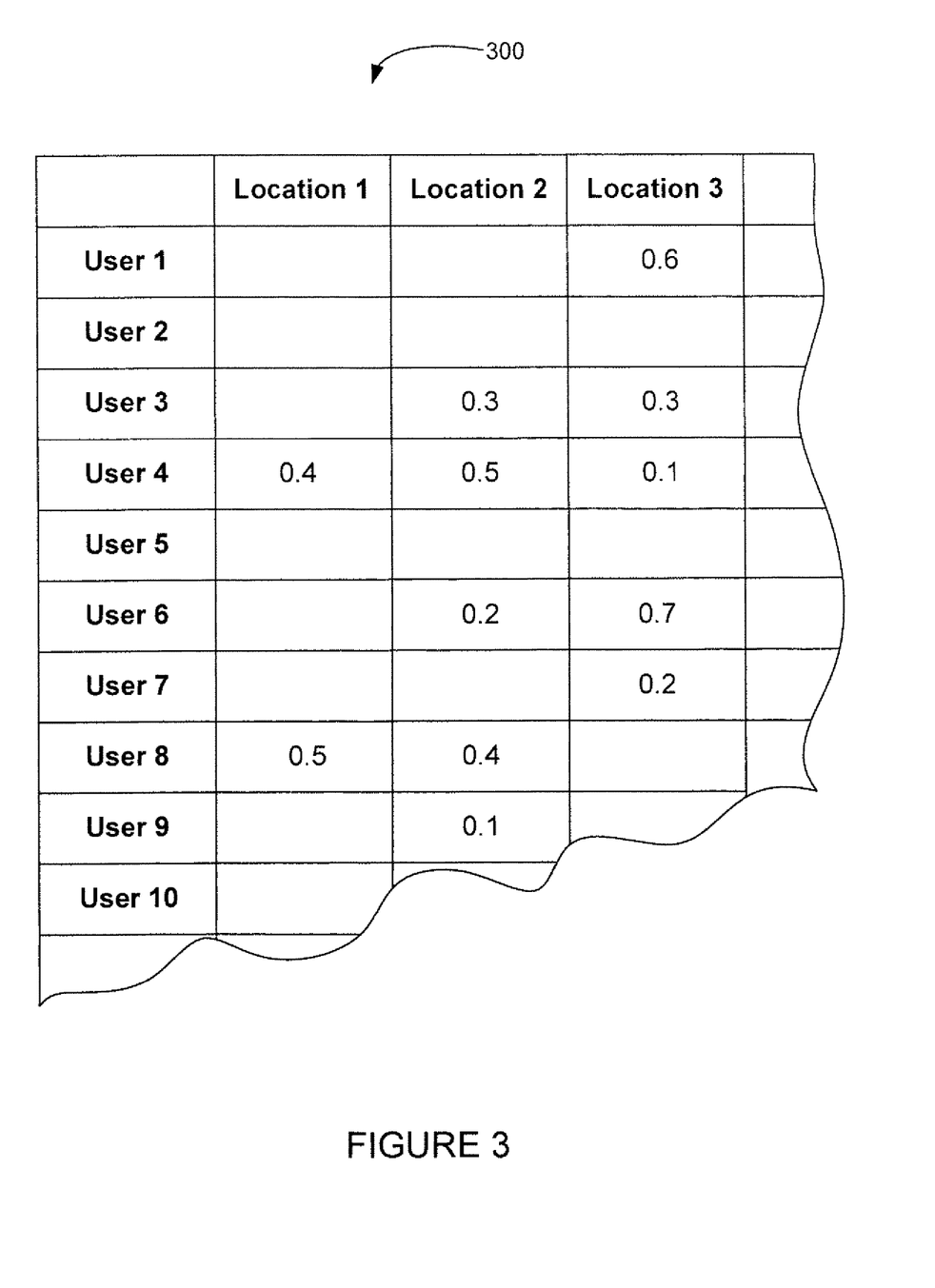
FIG. 3 is a functional diagram of information in accordance with an aspect of the invention.

As shown in FIG. 3, matrix 300 may include weighted values of actions associated with particular users at different locations. For example, user 1 may be associated with an action at location 3. As the weighted value associated with user 1 at location 3 is 0.6, user 1's client device may have registered one or more actions at location 3. For example, user 1 may have taken several pictures and/or video at location 3. In another example, there may be no association between user 1 and location 1 as no weighted value is indicated. Although only a few locations and users are displayed in matrix 300, it will be understood that the matrix may include any number of users and/or locations.

Based on the matrix information, each geographic location may be associated with a vector identifying a plurality of users (or user devices) and the weight assigned to the action(s) of each user (or device) at the particular location. For example, the vectors associated with locations 1, 2, and 3 of matrix 300 may be displayed as:

$$P_{Location\ 1} = \{[User4, 0.4]; [User8, 0.5]; \dots\},$$

$$P_{Location\ 2} = \{[User3, 0.3]; [User4, 0.5]; [User6, 0.2]; [User8, 0.4]; [User9, 0.1] \dots\}, \text{ and}$$

$$P_{Location\ 3} = \{[User1, 0.6]; [User3, 0.3]; [User4, 0.1]; [User6, 0.7]; [User7, 0.2] \dots\}.$$

These vectors are used to determine a correlation between different locations, as will be discussed in detail below.

In addition to the operations described below and illustrated in the figures, various operations in accordance with a variety of aspects of the invention will now be described. It should be understood that the following operations do not have to be performed in the precise order described below. Rather, various steps can be handled in reverse order or simultaneously.

Figure 4:
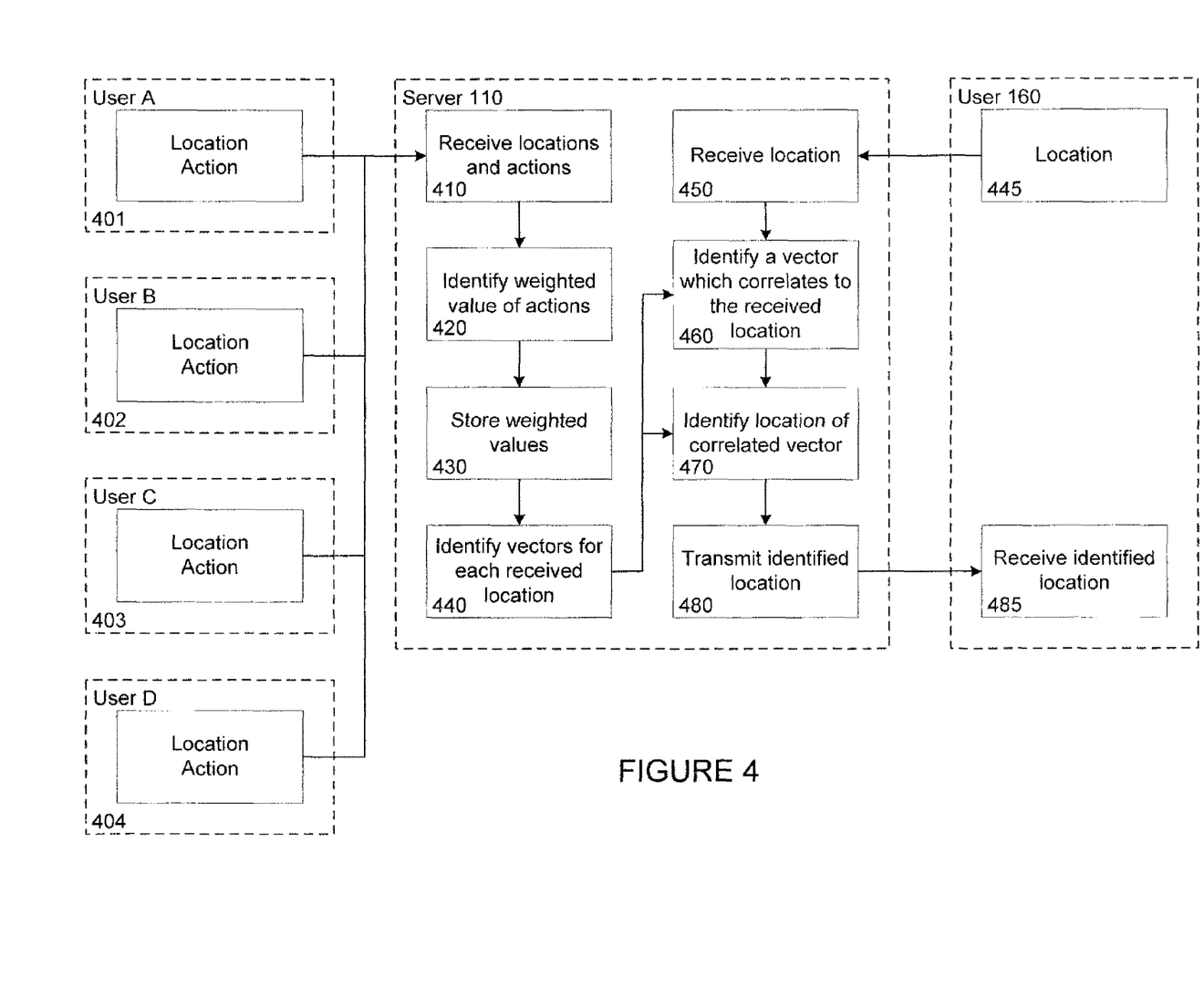
FIG. 4 is a flow chart in accordance with an aspect of the invention.

As shown in FIG. 4, a plurality of users, such as users A, B, C, and D at blocks 401-04, may transmit action information. For example, user A may take a video of a particular location. Server 110 may receive information identifying that a video was taken at that location. In one example, user A may then take some further action associated with the network, such as uploading or emailing the video. In another example, user A's device may automatically identify the action to the server, such as by using a visual search application to request information from the server.

As shown in block 410, server 110 may also receive location information associated with the action. For example, server 110 may identify an IP address associated with user A's device and determined a geographic location, such as by referring to a lookup table. In another example, server 110 may receive GPS information from user A's device. In a further example, server 110 may identify a location based on the identification of one or more cell phone towers. In still a further example, the content, such as user A's video, may identify the location associated with the action.

Based on the type of action received or identified by server 110, the server may assign a weighted value to the action as shown in block 420. For example, user 3 of matrix 300 may have taken a high quality video, such as high definition or 1080p signal, at location 2. Server 110 may identify the action and assign a weighted value such as 0.3.

If the server has previously identified an action taken by the user at the same location, server 110 may assign or revise a weight accordingly. For example, the server may assign the first high quality video from a particular user, such as user 4, some arbitrary value such as 0.3. If user 4 of matrix 300 has previously taken a high quality video at location 2 and server 110 determines that user 4 has taken a second high quality video at location 2, server 110 may assign a weighted value of 0.5 by assigning the second video by the same user less weight. Alternatively, the server may assign a weighted value of 0.6 by doubling 0.3. This information is then stored, for example in the database 144 such as a matrix, as shown in block 430.

Based on the stored information, at block 440 server 110 may identify a vector for each particular location as described above.

A user may transmit a location to server 110 as shown in block 445. For example, the user may be a client device which automatically transmits GPS information to server 110. In another example, the location may be identified as part of a request for information, such as a search request, map search request, visual search application request, or request for turn-by-turn directions. The location may or may not be associated with a particular action such as taking a picture or video as described above.

Then at block 450, server 110 may receive the location. As shown in block 460, server 110 may use the vectors generated at block 440 to identify a vector associated with the received location.

The identified vector may be used to identify correlated locations as shown in block 470. For example, the received location may be identified as location 3 associated with vector $_{PLocation\ 3}$={[User3, 0.3]; [User4, 0.5]; [User6, 0.2]; [User8, 0.4]; [User9, 0.1] ... }.

Returning to matrix 300, the identified vector may be compared to vectors associated with other locations.

Various methods of calculating similarities or associations may be used including calculation by cosine similarity, correlation based similarity, or other known methods. Using a simple example and comparing location 3 with locations 2 and 1, there may be several users which took actions at location 3 which also took actions at location 2. Comparing location 3 with locations 1, there may be fewer users which took actions at location 3 which also took actions at location 1.

In some examples, there may be no users which took actions at a first location who also took actions at a second location. The same may also be true for the vectors associated with each location. As shown in block 470, the vectors identified in block 440 may be compared as described above. Based on the example, server 110 may identify a high correlation between the vector associated with location 3 and the vector associated location 2. A correlation may exist even though the locations are physically remote, e.g. New York City and Lima, Peru. These correlations may indicate that people who were at different locations were interested in both locations. One reason may be similar architectural styles, beautiful scenery (such as exotic beaches), similar points of interest (soccer stadiums or restaurants), or similar events occurring at those locations.

As shown in block 480, the identified location may be transmitted to client device 160. For example, server 110 may transmit location 2 to the client device. Client device may receive the location at block 485.

Figure 5:
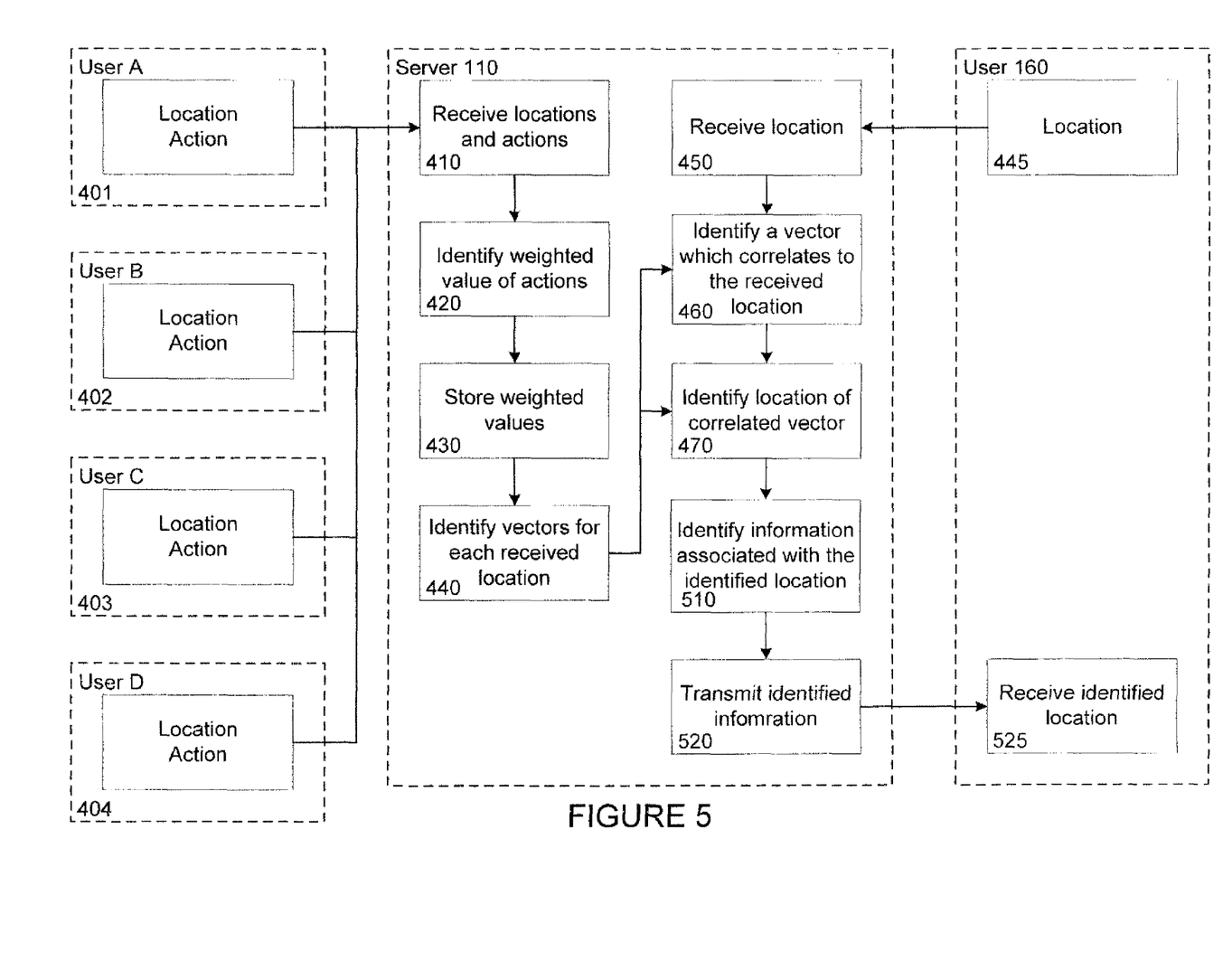
FIG. 5 is a flow chart in accordance with an aspect of the invention.

In another embodiment, the server may identify a correlated location and identify information associated with the identified vector as shown in block 510 of FIG. 5. For example, server 110 may identify advertisements associated with location 2 and transmit the advertisement at block 510 to client device 160. Client device 160 may receive the advertisement at block 525.

In a further embodiment, matrix 300 may store information associated with a particular action or data of interest. For example, matrix 300 may be associated with data such as pictures, audio recordings, or videos.

In still a further embodiment, server 110 may store information associated with a particular user rather than a particular user device. For example, server 110 may recognize a particular user, such as by assigning a unique identifier or requiring the user to login with a username and password. Each time the user identifies an action to the server from a particular device, server 110 identifies the user as well as an action associated with the user and stores this information in a database such as matrix 300. If the user identifies an action to server 110 with an alternate device, the server may again identify the user based on the unique identifier and update the matrix with the additional action information.

In still a further embodiment, the matrix and vectors may be used to recommend locations. For example, if server 110 identifies a correlation between Aspen, Colo. and New York City, N.Y., it may indicate that a user taking pictures of New York may also be interested in Aspen, Colo. Thus, server 110 may send a message to the user identifying Aspen, Colo. as a location of interest or to provide a targeted advertisement concerning Aspen.

The matrix and vector data may also be used to rank locations. The higher the number of correlations between vectors, the higher a location may be ranked. The reverse may also be true. Ranking information, for example, may be used by server 110 to identify and order search results.

The matrix and vector data may also be used to estimate a user's preference for a location even if the user has not been to that location yet. For example, the preference of user i over location j (u[i,j]) may be computed as a weighted sum of user i's preference over different other locations:

$$u[i,j]=w\_1*u[i,l\_1]+w\_2*u[i,l\_2]+\ldots+w\_k*u[i,l\_k]$$

In the above example, w_k is the similarity between location j and location l_k.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of identifying correlated locations based on information received from a plurality of client devices over a network, the method comprising:
   receiving, from each client device, information indicating a geographic location and at least one action taken at that geographic location;
   for each action associated with a particular client device, identifying a weighted value based on that action for the particular client device at the geographic location;
   for each client device, storing in a database an association between the weighted value and the geographic location; and
   identifying a correlation between a first geographic location and a second geographic location based on the stored associations, wherein identifying the correlation includes:
      generating, from the stored associations, a plurality of vectors, each vector associated with a given geographic location and including at least some of the plurality of client devices and the weighted value associated with each of the at least some of the plurality of client devices at that given location;
      receiving information identifying the first geographic location from a first client device;
      identifying a vector of the plurality of vectors associated with the first geographic location; and
      comparing the identified vector and other vectors of the plurality of vectors to determine if a correlation exists.

2. The method of claim 1, further comprising transmitting the second geographic location to the first client device.

3. The method of claim 1, further comprising:
   identifying content information associated with the second geographic location; and
   transmitting the identified content information to the first client device.

4. The method of claim 3, wherein the identified content information is an advertisement associated with the second geographic location.

5. The method of claim 1, wherein the first geographic location is identified in a request for information.

6. The method of claim 1, wherein the first geographic location is identified in a visual search request.

7. The method of claim 1, wherein the first geographic location is identified in a map search request.

8. A method of identifying correlated locations based on information received from a plurality of client devices each associated with a user over a network, the method comprising:
   receiving, from each client device, information identifying a particular user associated with the client device, information indicating a geographic location, and at least one action associated with the particular user taken at that geographic location;
   for each action associated with the particular user, identifying a weighted value based on that action for the particular user at the geographic location;
   for each particular user, storing in a database an association between the weighted value and the geographic location; and
   identifying a correlation between a first geographic location and a second geographic location based on the stored associations wherein identifying the correlation includes:
      generating, from the stored associations, a plurality of vectors, each vector associated with a given geographic location and including at least some of the plurality of client devices and the weighted value associated with each of the at least some of the plurality of client devices at that given location;
      receiving information identifying the first geographic location from a first client device;
      identifying a vector of the plurality of vectors associated with the first geographic location; and
      comparing the identified vector and other vectors of the plurality of vectors to determine if a correlation exists.

9. The method of claim 8, wherein the information identifying a particular user is user login information.

10. A device for identifying correlated locations based on information received from a plurality of client devices over a network, the device comprising:
    a memory; and
    a processor configured to:
    receive, from each client device of the plurality of client devices, information indicating a geographic location and at least one action taken at that geographic location;
    identify, for each action associated with a particular client device, a weighted value based on that action for the particular client device at the geographic location;
    for each client device, store in the memory an association between the weighted value and the geographic location;
    identify a correlation between a first geographic location and a second geographic location based on the stored associations;
    generate, from the stored associations, a plurality of vectors, each vector associated with a given geographic location and including at least some of the plurality of client devices and the weighted value associated with each of the at least some of the plurality of client devices at the given location;
    receive information identifying the first geographic location from a first client device;
    identify a vector of the plurality of vectors associated with the first geographic location; and
    compare the identified vector and other vectors of the plurality of vectors to determine if a correlation exists.

11. The device of claim 10, wherein the processor is further configured to transmit the second geographic location to the first client device.

12. The device of claim 10, wherein the processor is further configured to:
    identify content information associated with the second geographic location; and
    transmit the identified content information to the first client device.

13. The device of claim 12, wherein the identified content information is an advertisement associated with the second geographic location.

14. The device of claim 10, wherein the first geographic location is identified in a request for information.

15. The device of claim 10, wherein the first geographic location is identified in a visual search request.

16. The device of claim 10, wherein the first geographic location is identified in a map search request.

17. The device of claim 10, wherein the at least one action received from each of the plurality of client devices is selected from the group consisting of capturing an image, capturing video, capturing audio, or a request for information.

18. The device of claim 10, wherein the processor is further configured to identify the weighted value based on the sum of all of the actions for the particular client device at the geographic location.

* * * * *